US011014180B2

(12) United States Patent
Alletzhaeusser et al.

(10) Patent No.: US 11,014,180 B2
(45) Date of Patent: May 25, 2021

(54) SOLDERING SYSTEM

(71) Applicant: ERSA GmbH, Wertheim (DE)

(72) Inventors: Thomas Alletzhaeusser, Wertheim (DE); Tim Alletzhaeusser, Wertheim (DE)

(73) Assignee: ERSA GmbH, Wertheim (DE)

( * ) Notice: Subject to any disclaimer, the term of this patent is extended or adjusted under 35 U.S.C. 154(b) by 401 days.

(21) Appl. No.: 16/166,286

(22) Filed: Oct. 22, 2018

(65) Prior Publication Data
US 2019/0126375 A1    May 2, 2019

(51) Int. Cl.
| | |
|---|---|
| B23K 3/00 | (2006.01) |
| B23K 3/02 | (2006.01) |
| B23K 3/04 | (2006.01) |
| B23K 3/06 | (2006.01) |
| B23K 3/08 | (2006.01) |
| B23K 3/03 | (2006.01) |
| H04L 29/08 | (2006.01) |
| B23K 3/047 | (2006.01) |
| B23K 31/12 | (2006.01) |
| B23K 37/02 | (2006.01) |
| G05D 23/22 | (2006.01) |
| B23K 101/42 | (2006.01) |

(52) U.S. Cl.
CPC ............ *B23K 3/033* (2013.01); *B23K 3/00* (2013.01); *B23K 3/0478* (2013.01); *B23K 3/08* (2013.01); *B23K 31/12* (2013.01); *B23K 37/0258* (2013.01); *G05D 23/22* (2013.01); *H04L 67/025* (2013.01); *H04L 67/12* (2013.01); *H04L 67/125* (2013.01); *B23K 2101/42* (2018.08)

(58) Field of Classification Search
None
See application file for complete search history.

(56) References Cited

U.S. PATENT DOCUMENTS

| | | |
|---|---|---|
| 4,935,600 A | 6/1990 | Pachschwoll |
| 6,624,388 B1 | 9/2003 | Blankenship et al. |
| 9,327,361 B2* | 5/2016 | Marino ............... H05K 3/34 |
| 2005/0197115 A1* | 9/2005 | Clark ............... B23K 9/0953 |
| | | 455/426.1 |

(Continued)

FOREIGN PATENT DOCUMENTS

CA    2762296 A1    6/2013

OTHER PUBLICATIONS

European Search Report of application No. EP 17198550, pp. 1-7, dated Mar. 29, 2018.

*Primary Examiner* — Joseph M. Pelham
(74) *Attorney, Agent, or Firm* — Bond Schoeneck & King, PLLC

(57) ABSTRACT

Soldering system includes a first soldering device having a control apparatus that has a central microcontroller and/or microprocessor and is designed for controlling at least one operating parameter of the soldering device, wherein a radio module is provided which includes a communication module designed for setting up a wireless data connection, and at least a second soldering device having a control apparatus that has a central microcontroller and/or microprocessor and is designed for controlling at least one operating parameter of the soldering device, wherein a radio module is provided which comprises a communication module designed for setting up a wireless data connection.

13 Claims, 8 Drawing Sheets

(56) References Cited

U.S. PATENT DOCUMENTS

| | | | |
|---|---|---|---|
| 2015/0114941 A1* | 4/2015 | Denis | G08C 17/00 |
| | | | 219/132 |
| 2015/0246404 A1 | 9/2015 | Teraoka et al. | |
| 2016/0096232 A1* | 4/2016 | Marino | B23K 3/03 |
| | | | 228/9 |
| 2016/0221098 A1* | 8/2016 | Marino | B23K 31/125 |
| 2016/0274568 A1* | 9/2016 | Gitter | B23K 37/00 |
| 2019/0129377 A1* | 5/2019 | Gill | B23K 9/295 |
| 2020/0130085 A1* | 4/2020 | Miyazaki | B23K 3/08 |

* cited by examiner

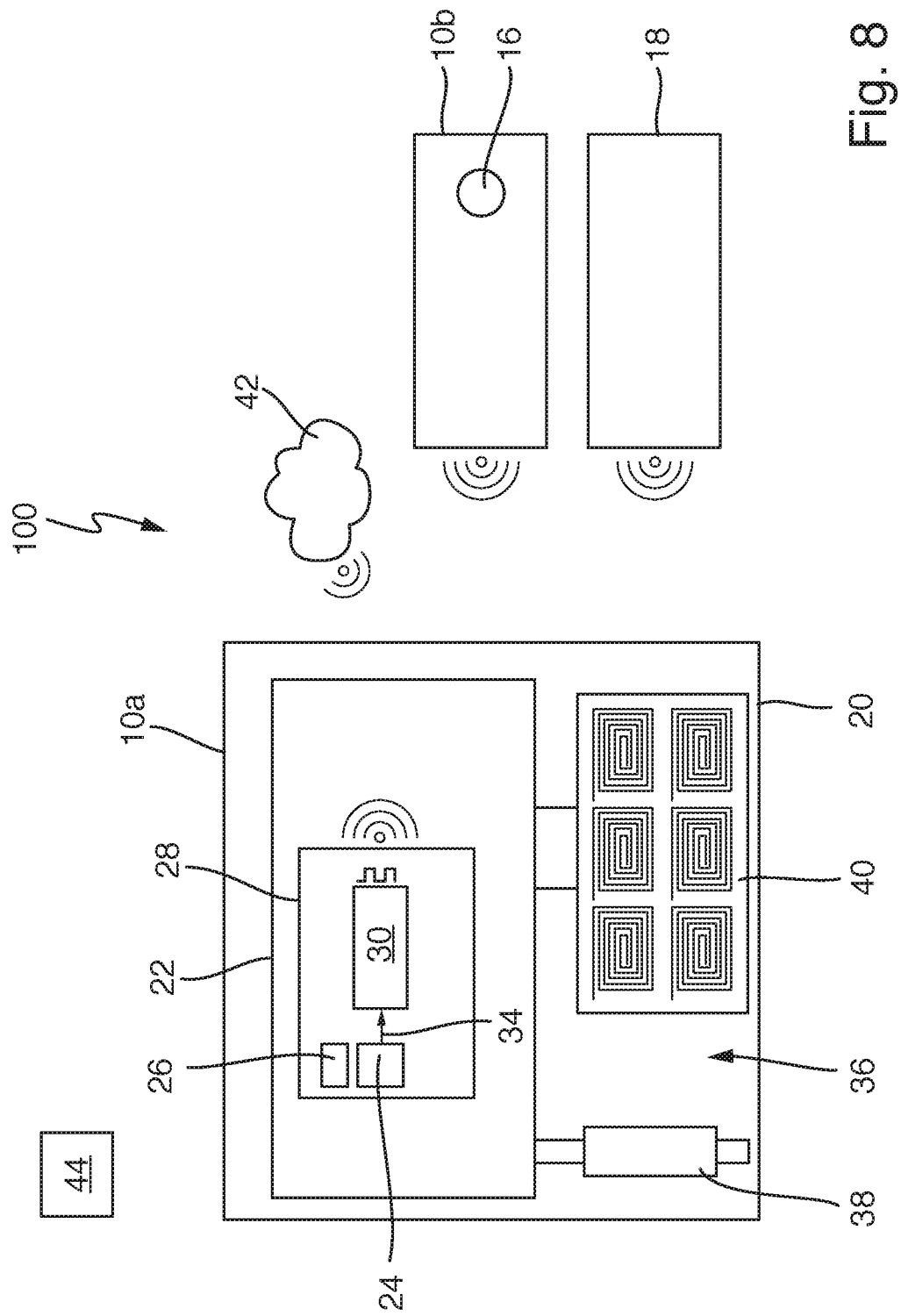

SOLDERING SYSTEM

CROSS-REFERENCE TO RELATED APPLICATIONS

This application claims priority to European Application No. EP 17 198 550.0-1016 filed on Oct. 26, 2017, the entire disclosure of each of which is incorporated herein by reference.

BACKGROUND ON THE INVENTION

The invention relates to a soldering system, comprising at least two soldering devices. Soldering devices are in particular a soldering station for manual soldering or for robot-operated soldering or desoldering, a rework system, a solder bath, a hot plate or a solder-fume extraction device, comprising a control apparatus that has a central microcontroller and/or microprocessor and is designed for controlling at least one operating parameter of the soldering device. The invention further relates to a method for operating a soldering system of this type.

Soldering devices of the type mentioned at the outset are widely known from the prior art. Soldering devices for manual soldering which comprise a soldering iron, a desoldering iron or a hot air gun are commonly known as soldering stations. It is conceivable in this case for the soldering iron to be operated manually or by robot.

Solder-fume extraction devices are used for extracting vapors or soldering fumes which result from soldering or desoldering. The solder-fume extraction devices typically comprise a filter and a fan wheel which is driven by a speed-controlled electric motor.

Soldering devices designed as hot plates are apparatuses for heating a printed circuit board to be processed during manual or robot-operated soldering.

Rework systems or rework apparatuses refer to soldering devices used in the context of prototyping and the repair of electronics. Rework systems of this type typically comprise a plurality of motor-driven or manually driven shafts. The rework systems known from the prior art further comprise heating apparatuses, in particular heating apparatuses for heating a working space which are arranged above and below the working space, grip apparatuses arranged on the shafts, and cameras and sensors for process monitoring, such as temperature sensors.

Said soldering devices known from the prior art are often used together. It is therefore known e.g. to extract vapors or soldering fumes occurring in a rework system by means of a solder-fume extraction device. Moreover, it is known to use a soldering station together with the hot plates mentioned at the outset, and to likewise extract vapors or soldering fumes which result from soldering or desoldering by means of a solder-fume extraction device.

Some of the known soldering devices can be interconnected by means of cables, such that it is possible to operate a solder-fume extraction device or a hot plate only when the soldering station is also being operated for soldering or desoldering, or when a rework system is being operated. Since the apparatuses in question are therefore operated only when necessary, energy can be saved.

US 2015/0246404 A1 shows a soldering device, which comprises a control unit, which communicates via a radio connection with a power supply unit of the soldering device.

However, it is evident from the soldering devices known from the prior art that connecting the different soldering devices by means of cables results in a considerable amount of wiring being required at the particular work location, and that, owing to the connection by means of wires, the soldering devices are not particularly flexible in terms of the use thereof.

SUMMARY OF THE INVENTION

The problem addressed by the invention is therefore that of developing a soldering system of the type mentioned at the outset such that the soldering devices can be used in general in a flexible manner. In addition, the soldering devices should be simple and cost-effective to produce.

A soldering system comprises a first soldering device and at least a second soldering device, and/or at least one electronic device that comprises an output apparatus for visually outputting information, the first soldering device being designed for setting up a wireless data connection to the second soldering device and/or the electronic device.

According to the invention, the first soldering device is designed for wirelessly controlling the at least second soldering device, and/or the first soldering device is designed for wirelessly relaying or wirelessly receiving data from the electronic device. Operating and/or process parameters of the first and/or second soldering device can then be advantageously output to a user on a screen of a smart phone. It is also conceivable for it to be possible for the soldering device to be updated by wirelessly receiving data. Furthermore, it is possible to achieve dynamic process control which, if necessary, does not extend only over the working space of a single person or of a single soldering device, but can be expanded to an entire production line or production hall.

The invention therefore significantly increases the flexibility such that users can connect the individual soldering devices to one another, in particular via a cloud or a server, and/or link them to a database, and such that the data can then be easily locally visualized in real time on various devices (mobile phone, tablet).

A soldering device of the soldering system according to the invention is distinguished by a radio module being provided which comprises a communication module designed for setting up a wireless data connection. The communication module is advantageously designed for transmitting and receiving radio data.

It is conceivable for the communication module to be designed for transmitting and receiving radio data in different frequency bands, for example in the 433 MHz band, in the 868 MHz band, in the 2.4 GHz band or in the 5 GHz band. Furthermore, it is possible for the communication module to be designed for transmitting and receiving radio data by means of different communication protocols. For example, it is conceivable for the communication module to be designed for transmitting and receiving according to the Bluetooth, Xbee, Zigbee, WiFi or LoRa protocols. In this way, radio data can be exchanged in different operating modes, e.g. peer-to-peer, point-to-point or even point-to-multipoint.

The control apparatus is also designed for controlling operating parameters of the soldering device. It has been shown to be particularly preferable when the control apparatus is also designed for measuring operating and process parameters. It is also conceivable for the control apparatus to be designed for monitoring service life, for example. The measured and/or monitored data can advantageously also be displayed on a display means. The service life of a soldering tip arranged on a soldering iron can thus be monitored and displayed. It is also conceivable for the control apparatus to monitor the service life of a filter of a solder-fume extraction device, or a contamination level of the filter of the solder-fume extraction device, for example based on the motor current of the electric motor that drives a fan wheel of the solder-fume extraction device.

Soldering devices of the system have been shown to be particularly advantageous since, in particular in soldering systems which comprise a plurality of soldering devices, highly flexible communication between the individual soldering devices can be made possible in a simple manner. For example, it is possible for a speed of an electric motor that drives a fan wheel of a solder-fume extraction device to be controlled depending on the particular soldering program of another soldering station, or depending on the particular soldering temperature. Furthermore, it is for example also conceivable for an electric motor that drives the fan wheel to be switched on or off depending on the operation of one or other soldering stations.

According to a first advantageous development of the soldering system, the radio module comprises the central microcontroller and/or microprocessor. The computing power required for the control apparatus can thus be provided by the microcontroller and/or microprocessor of the radio module. An additional microcontroller and/or microprocessor is therefore not necessarily required.

Alternatively, however, it is also conceivable for the radio module to comprise an additional microcontroller and/or microprocessor which is different from the central microcontroller and/or microprocessor. It is consequently possible for central computing tasks of the control apparatus to be taken on by the central microcontroller and/or microprocessor, the additional microcontroller and/or microprocessor being used only for communication with the central microcontroller and/or microprocessor.

A data line, in particular a BUS connection, designed such that it connects the central microcontroller and/or microprocessor to the communication module, is advantageously provided. It is conceivable for the BUS data line to be an RxD-TxD data line, an PC bus, an SPI bus, an LIN bus, a CAN bus or a USB bus. Any other type of BUS data line is also possible, however.

When an additional microcontroller and/or microprocessor is provided, it has been shown to be particularly advantageous when the data line is designed such that it indirectly connects the central microcontroller and/or microprocessor to the communication module via the additional microcontroller and/or microprocessor.

In another advantageous embodiment of the soldering system, the soldering device comprises a housing, and the radio module is arranged in the housing. Arranging the radio module within the housing allows a wireless data connection, it being possible to avoid housing openings for connecting the data line to the radio module. Furthermore, an additional requirement of internal wiring to a jack of the data line, which jack is arranged outside the housing, can be avoided. In this way, a particularly cost-effective soldering device can be provided overall, the soldering device being, at the same time, more resistant to external influences such as dirt or liquids owing to the reduced number of openings in the housing.

Alternatively, however, it is also possible for the soldering device to comprise a housing on which a jack of the data line is arranged, the radio module being arranged outside the housing and comprising a plug of the data line. A radio module can thus be attached for example to a USB jack of a USB data line of a soldering device, which jack is arranged on the housing.

The control apparatus advantageously comprises a memory designed for storing soldering programs and/or soldering parameters.

It is conceivable in this case for the electronic device to be a smart phone, a tablet computer, a laptop computer, a PC, a pair of smart glasses or a server. It is also conceivable for the wireless data connection to be set up indirectly via a server. If the server is connected to the Internet, it is possible for example for remote maintenance and/or remote diagnosis to be carried out on the soldering device by the manufacturer.

It is also conceivable for the electronic device to create a specific soldering program that instructs the user to solder relevant soldering points using the components provided therefor, and to change or replace the soldering parameters or soldering tools according to requirements, thus achieving a type of setup management. A pair of smart glasses can, for example, recognize the printed circuit board to be soldered and display the instructions, the location of the component on the printed circuit board and the physical and electrical characteristics thereof directly in the user's field of vision.

According to another advantageous embodiment of the soldering system, a scanner is provided which is designed for reading a visual code and is connected to the control apparatus of the first soldering device. It is conceivable in this case for the scanner to be designed for reading a one-dimensional code (1D code), such as a barcode. It is also possible, however, for the scanner to be designed for reading a two-dimensional code (2D code), such as a Data Matrix code or a QR code.

A visual code of this type can be provided on a printed circuit board to be processed, for example. It is conceivable in this case for the control apparatus of the first soldering device to save operating parameters of the first and/or second soldering device based on the code read by the scanner. Component-specific documentation of the operating and process parameters can thus be carried out, it being possible, when faulty components (e.g. cold solder joints) occur, to check the operating and process parameters saved for the processing of the particular faulty component. In the case of consistently incorrect operating and process parameters, entire batches of components can thus be subsequently identified and checked for faults.

It is also possible for the control apparatus of the first soldering device to select, based on a code read in by the scanner, a soldering profile, a soldering parameter and/or a soldering program saved in the memory of the first soldering device, and to display it on a display of the first soldering device and/or on a display of the electronic device.

The problem mentioned at the outset is also solved by a method having the features of claim 12. In this case, the control apparatus of the first soldering device wirelessly controls at least one operating parameter of the second soldering device. It is therefore conceivable, for example, for the control apparatus of a soldering station to control a speed of an electric motor that drives a fan wheel of a solder-fume extraction device.

It is particularly preferable when the operating parameter of the second soldering device is controlled depending on an operating parameter of the first soldering device. For example, the speed of the electric motor that drives the fan wheel can therefore be controlled depending on the soldering temperature of a soldering tip, which temperature is set at the soldering station.

Furthermore, it is also possible for the operating parameter of the second soldering device to be controlled depending on a measured process parameter of the first soldering device. The speed of the electric motor that drives the fan wheel can therefore be controlled depending on the temperature measured at a soldering tip of a soldering iron, for example.

Further details and advantageous developments can be found in the following description, on the basis of which different embodiments of the invention are explained and described in more detail.

BRIEF DESCRIPTION OF THE DRAWINGS

In the drawings:

FIG. 8 is a schematic view of an eighth embodiment of a soldering system according to the invention.

DETAILED DESCRIPTION

Figure 1:
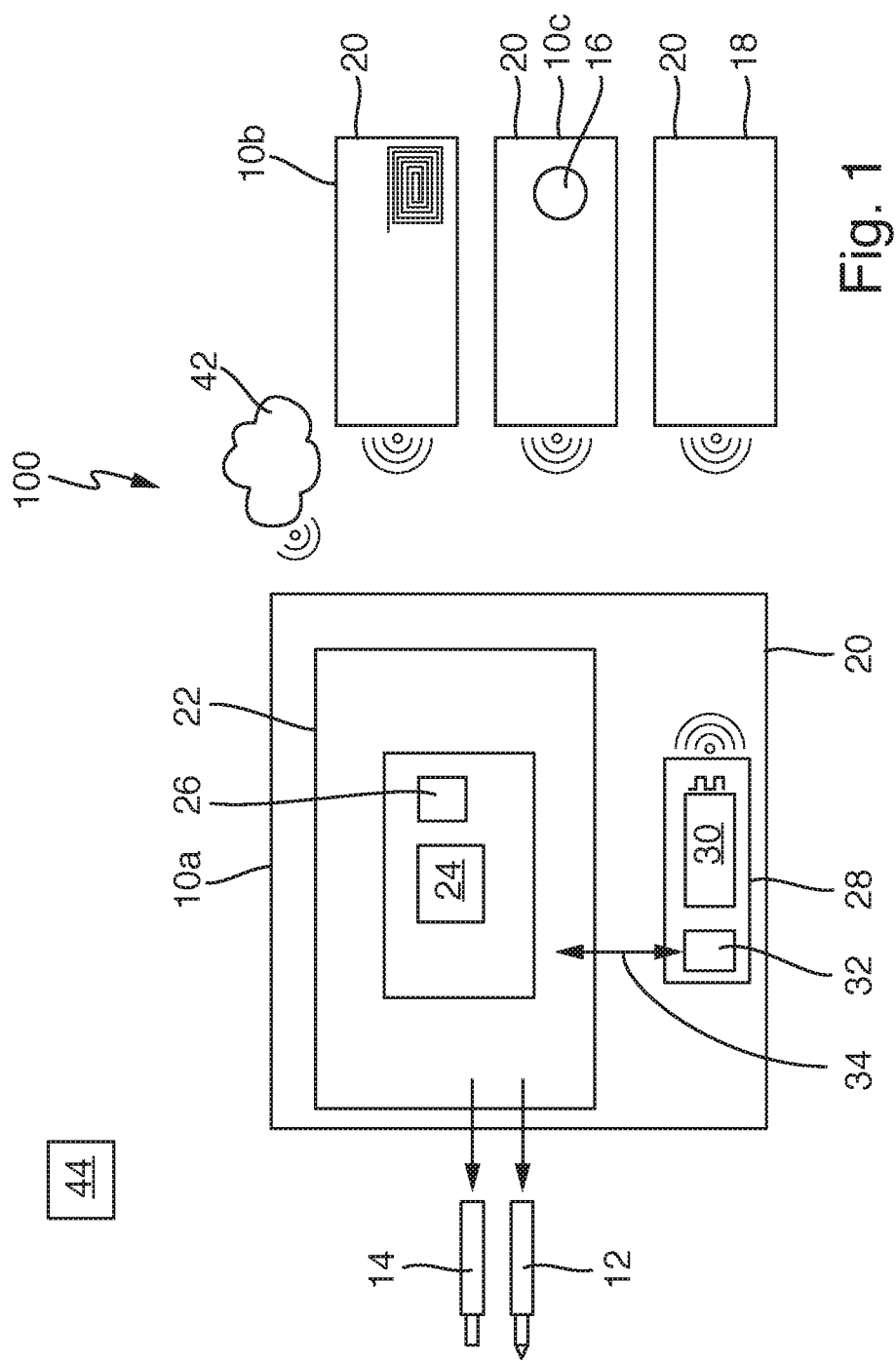
FIG. 1 is a schematic view of a first embodiment of a soldering system according to the invention.

FIG. 1 to 8 each show different embodiments of a soldering system 100 according to the invention. Elements that correspond to one another in the drawings are denoted by corresponding reference signs.

Figure 2:
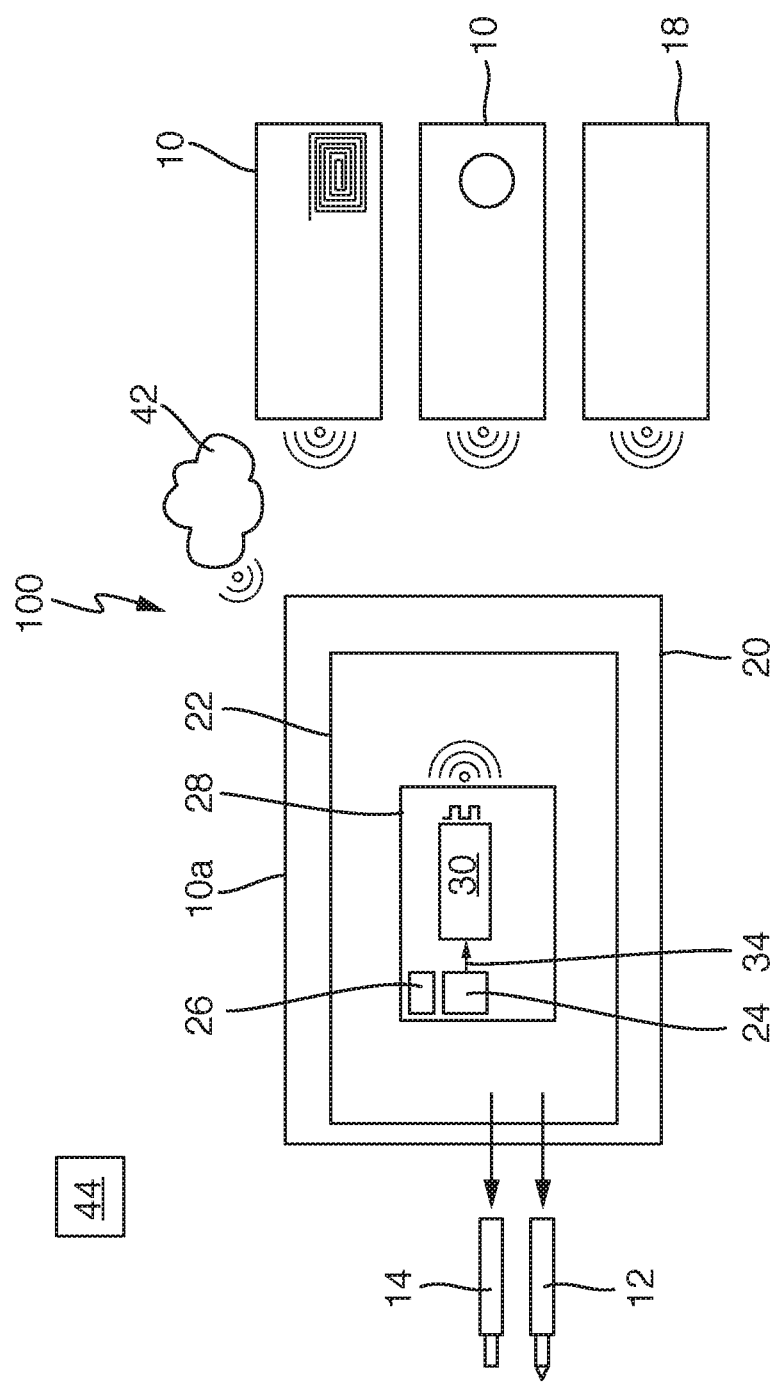
FIG. 2 is a schematic view of a second embodiment of a soldering system according to the invention.

FIGS. 1 and 2 each show a soldering system 100 comprising a plurality of soldering devices 10.

In this case, the soldering system 100 comprises a first soldering device 10a designed as a soldering station and comprising a manually operated or robot operated soldering iron 12 and/or a manually operated or robot-operated hot air gun 14. The soldering system 100 further comprises a second soldering device 10b designed as a hot plate and intended for heating a printed circuit board to be processed. Furthermore, the soldering system 100 comprises a third soldering device 10c designed as a solder-fume extraction device and intended for extracting vapors or soldering fumes resulting from soldering or desoldering.

The solder-fume extraction device 10c comprises a filter (not shown in the drawings) and a fan wheel (not shown in the drawings) that is driven by a speed-controlled electric motor 16. The soldering system shown in FIGS. 1 and 2 further comprises an electronic device apparatus 18 for visually outputting information. The electronic device 18 can be a smart phone, a tablet computer, a laptop computer, a PC, a pair of smart glasses or a server, for example.

As can be seen clearly in FIGS. 1 and 2, the soldering devices 10a, 10b and 10c each comprise a housing 20. The soldering devices 10a, 10b and 10c each also comprise a control apparatus 22 arranged in the housing 20.

The control apparatuses 22 comprise a central microprocessor 24 and a memory 26. The memory apparatus 26 of the first soldering device 10a that is shown in FIGS. 1 and 2 and designed as a soldering station is, for example, designed for storing soldering programs and/or soldering parameters.

The control apparatus 22 is designed for controlling at least one operating parameter of the soldering devices 10a, 10b and 10c. The control apparatus 22 can also be designed for controlling operating parameters of the soldering device 10a, 10b and 10c. It is also conceivable for the control apparatus 22 to be designed for measuring operating and process parameters. For example, the control apparatus 22 can be designed for monitoring the service life of a tool attached to the soldering devices 10a, 10b or 10c. The service life of a soldering tip arranged on a soldering iron 12 can thus be monitored, for example. It is also conceivable for the control apparatus 22 to monitor the service life of a filter of a solder-fume extraction device 10c, or a contamination level of the filter of the solder-fume extraction device, for example based on the motor current of the electric motor 16 that drives a fan wheel of the solder-fume extraction device 10c.

The soldering devices 10a, 10b, 10c each comprise a radio module 28, which in turn comprises a communication module 30 designed for setting up a wireless data connection. In the first soldering device 10a shown in FIG. 2, the radio module 28 comprises the central microprocessor 24, the radio module 28 in the soldering device 10a shown in FIG. 1 comprising an additional microprocessor 32 which is different from the central microprocessor 24. Therefore, in the first soldering device 10a shown in FIG. 2, central computing tasks of the control apparatus 22 are taken on by the central microprocessor 24 of the radio module 28.

The communication module 30 is connected to the central microprocessor 24 by means of a data line 34. The data line 34 can be in particular a BUS data line. It is conceivable for the data line 34 to be an RxD-TxD connection, an I$^2$C bus, an SPI bus, an LIN bus, a CAN bus or a USB connection. Any other type of BUS data line is also possible, however. Furthermore, it is for example conceivable for the communication module 30 to be designed for transmitting and receiving radio data in different frequency bands, for example in the 433 MHz band, in the 868 MHz band, in the 2.4 GHz band or in the 5 GHz band. Furthermore, it is possible for the communication module 30 to be designed for transmitting and receiving radio data by means of different communication protocols. For example, it is conceivable for the communication module to be designed for transmitting and receiving according to the Bluetooth, Xbee, Zigbee, WiFi or LoRa protocols. In this way, radio data can be exchanged in different operating modes, for example peer-to-peer, point-to-point, or even point-to-multipoint.

In the soldering devices 10a, 10b and 10c shown in FIG. 1, the data line 34 indirectly connects the central microprocessor 24 to the communication module 30 via the additional microprocessor 32. The radio module 28 is arranged in the housing 20 of the soldering devices 10a, 10b, 10c, and therefore housing openings for connecting the data line 34 to the radio module 28 can be avoided. Furthermore, an additional requirement of internal wiring to a jack of the data line 28, which jack is arranged outside the housing 20, can be avoided. External influences owing to contamination, along with costs for internal wiring, can thus be reduced.

Figure 3:
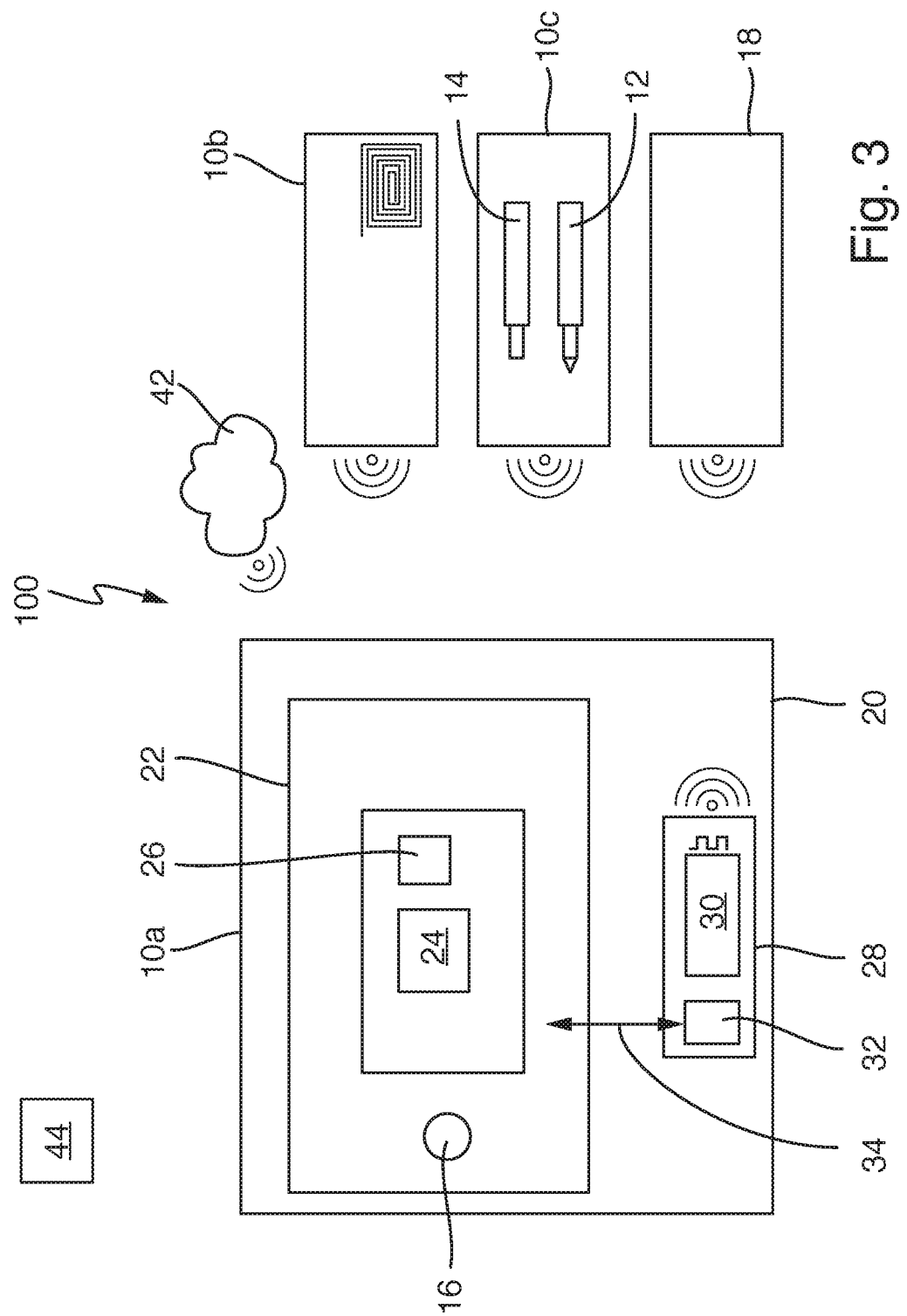
FIG. 3 is a schematic view of a third embodiment of a soldering system according to the invention.
Figure 5:
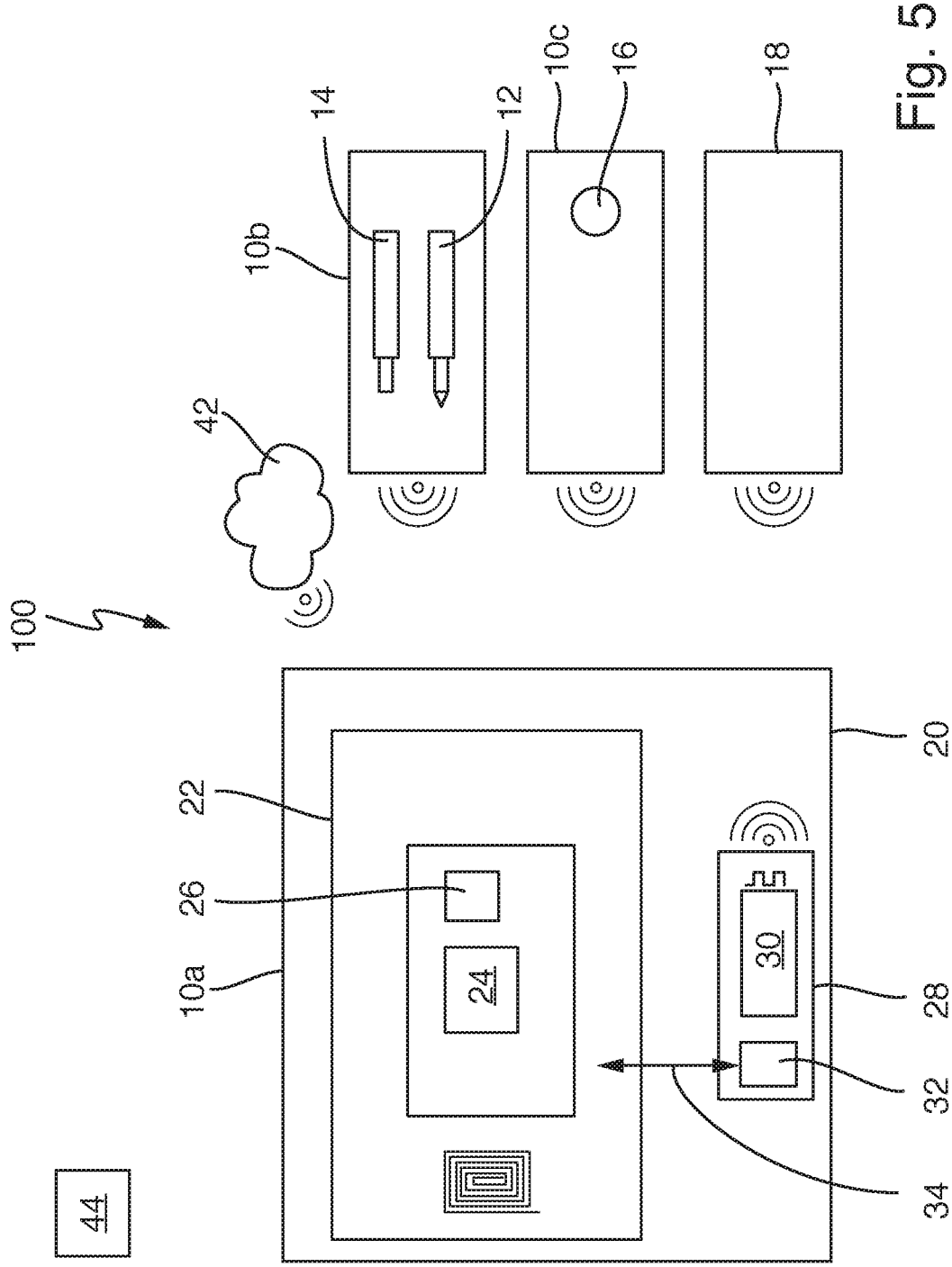
FIG. 5 is a schematic view of a fifth embodiment of a soldering system according to the invention.

The soldering systems 100 shown in FIGS. 3 and 5 substantially correspond to the soldering system 100 shown in FIG. 1. The only difference is that, in the soldering system 100 shown in FIG. 3, the first soldering device 10a is a solder-fume extraction device, the second soldering device 10b is a hot plate and the third soldering device 10c is a soldering station. In the soldering system 100 shown in FIG. 5, the first soldering device 10a is a hot plate, the second soldering device 10b is a soldering station and the third soldering device 10c is a solder-fume extraction device.

Figure 4:
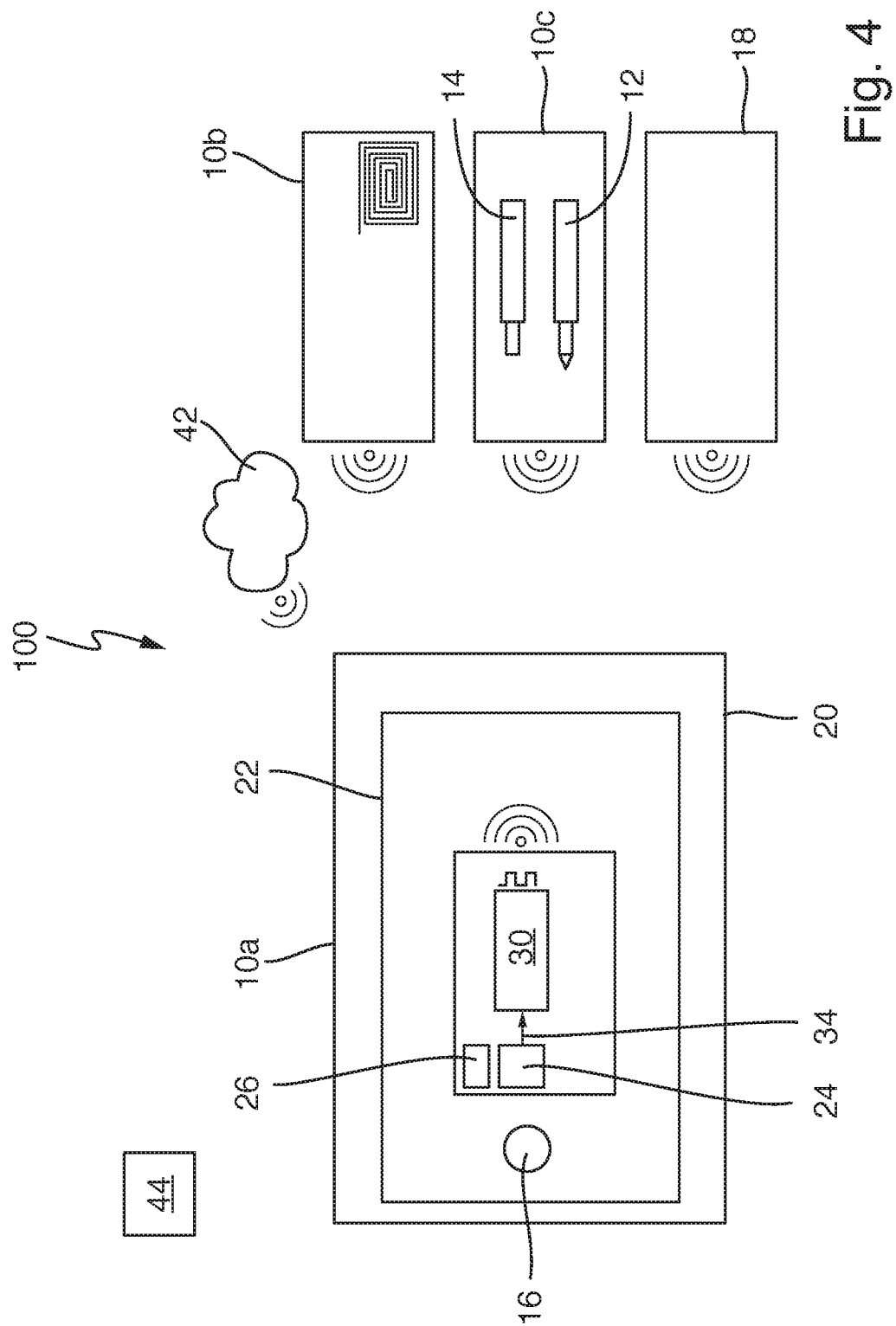
FIG. 4 is a schematic view of a fourth embodiment of a soldering system according to the invention.
Figure 6:
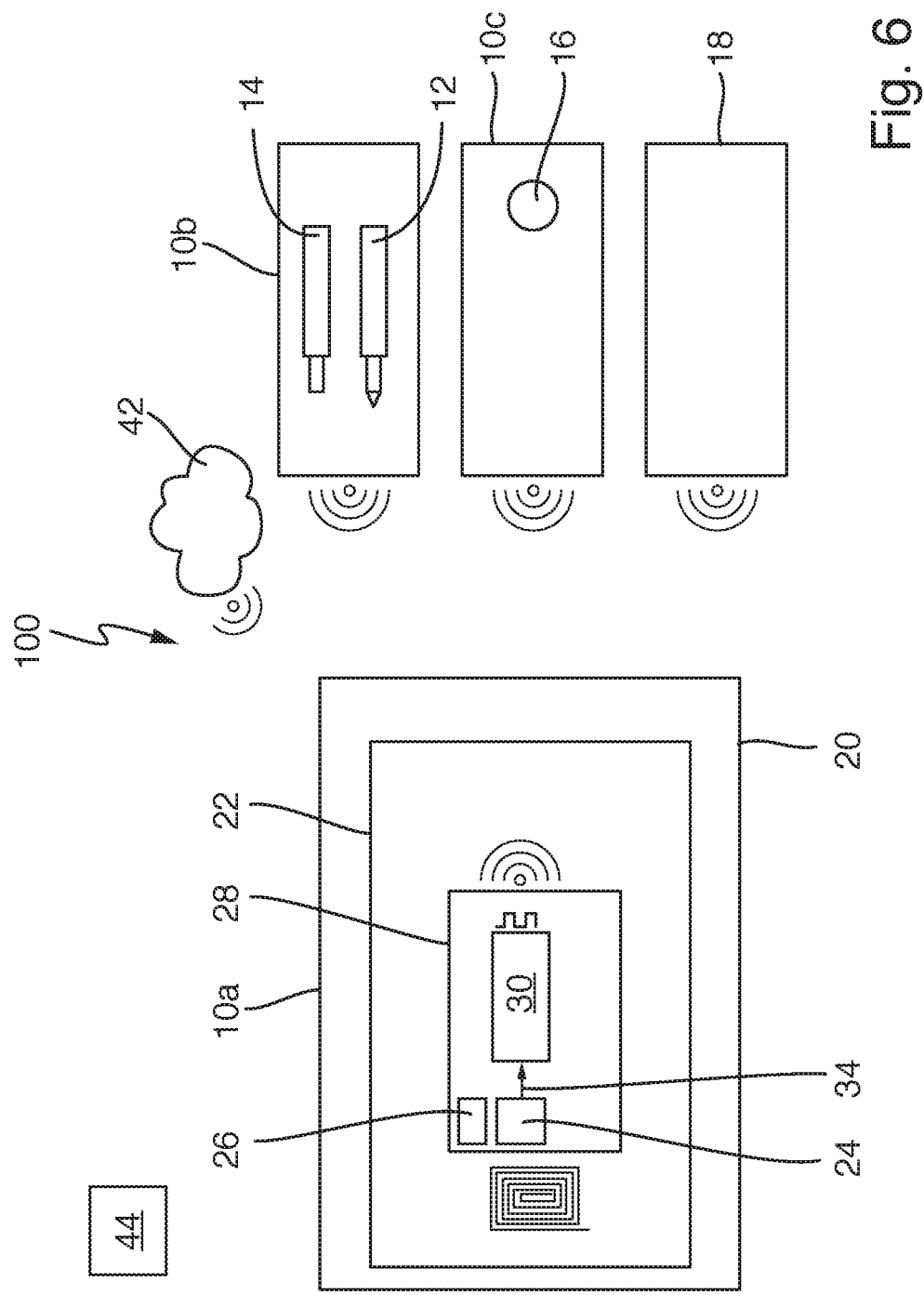
FIG. 6 is a schematic view of a sixth embodiment of a soldering system according to the invention.

Furthermore, the soldering systems 100 shown in FIGS. 4 and 6 substantially correspond to the soldering system 100 shown in FIG. 2. The only difference is that, in the soldering system 100 shown in FIG. 4, the first soldering device 10a is a solder-fume extraction device, the second soldering device 10b is a hot plate and the third soldering device 10c is a soldering station. In the soldering system 100 shown in FIG. 6, the first soldering device 10a is a hot plate, the second soldering device 10b is a soldering station and the third soldering device 10c is a solder-fume extraction device.

Figure 7:
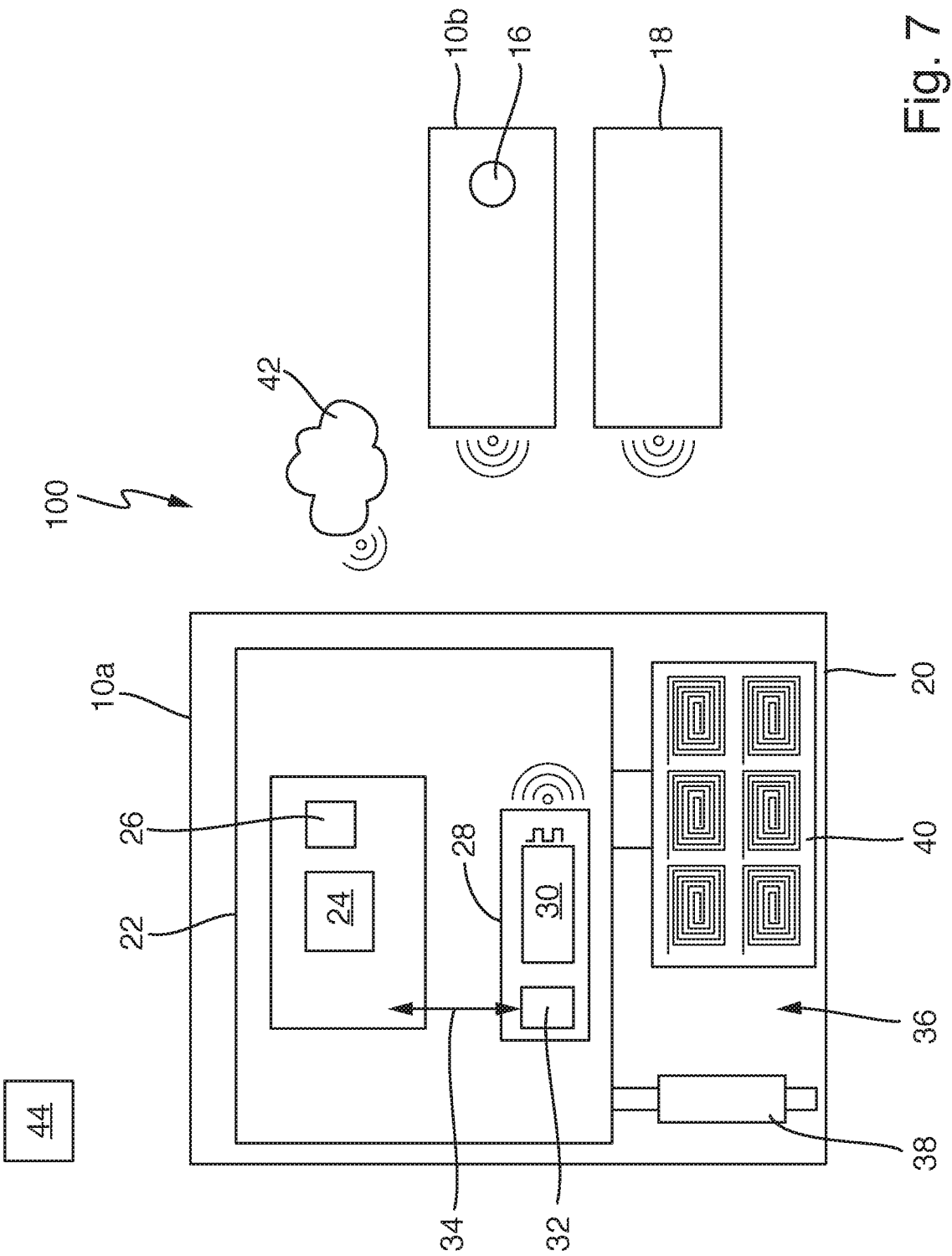
FIG. 7 is a schematic view of a seventh embodiment of a soldering system according to the invention.

In FIGS. 7 and 8, the first soldering device 10a of the soldering system 100 is in each case designed as a rework system which is used in the context of prototyping and the repair of electronics, for example. The second soldering device 10b is in turn designed as a solder-fume extraction device. Moreover, the control apparatuses 22 of the soldering devices 10a shown in FIGS. 7 and 8 correspond to the control apparatuses 22 of the soldering device 10a shown in FIGS. 1 and 2.

The soldering devices 10a designed as rework systems comprise a plurality of motor-driven or manually driven shafts (not shown in the drawings). Furthermore, in order to heat a working space 36, the rework systems 10a each comprise a heating apparatus 38 arranged above the working space 36 and a heating apparatus 40 arranged below the working space 36. Furthermore, grip apparatuses arranged on the shafts, and cameras and sensors for process monitoring, such as temperature sensors, can be provided.

The soldering systems 100 shown in FIG. 1 to 8 each function in a similar manner, and therefore the same explanation is provided for all the soldering systems 100 shown in said figures.

The first soldering device 10a is designed in each case for setting up a wireless data connection to the second soldering device 10b and/or the third soldering device 10c and/or the electronic device 18. It is also conceivable for the wireless data connection to be set up with a server 42, in particular in the form of a cloud. If the server 42 is connected to the Internet, it is for example possible for remote maintenance and/or remote diagnosis to be carried out on the soldering device 10a by the manufacturer.

The first soldering device 10a is designed in each case for wirelessly controlling the second soldering device 10b and/or the third soldering device 10c. Furthermore, the first soldering device 10a is designed for the wireless or wired relay of data to the electronic device 18 or for the wireless or wired receipt of data from the electronic device 18. Operating and/or process parameters of the first, second and/or third soldering device 10a, 10b, 10c, for example, can then be output to a user on a screen of a smart phone, tablet, screen and/or a pair of smart glasses. It is also conceivable for it to be possible for the soldering device 10a to be updated by wirelessly receiving data, for example from the server 42 or from the electronic device 18. Furthermore, it is possible to achieve dynamic process control of the soldering device 10a, or of a plurality of soldering devices. It is also conceivable for a user to be instructed to replace tools (for example to replace a soldering tip) by means of a soldering program saved in the memory 26 of the first soldering device 10a. The soldering system 100 thus allows a type of setup management. A pair of smart glasses can display these instructions directly in the user's field of vision, for example. A pair of smart glasses designed for recognizing the printed circuit board can mark the points to be soldered in the user's field of vision and display the components necessary therefor alongside their physical sizes and electrical values.

A scanner 44 can also be provided which is designed for reading a visual code and is connected to the control apparatus 22 of the first soldering device 10a. It is conceivable in this case for the scanner 44 to be designed for reading a one-dimensional code (1D code), such as a barcode. It is also possible, however, for the scanner to be designed for reading a two-dimensional code (2D code), such as a Data Matrix code or a QR code.

A visual code of this type can be provided on a printed circuit board to be processed, for example. It is conceivable in this case for the control apparatus 22 of the first soldering device 10a to save operating and/or process parameters of the first, second and/or third soldering device 10a, 10b, 10c based on the code read by the scanner 44. Component-specific documentation of the operating and process parameters can thus be carried out, it being possible, when faulty components (e.g. cold solder joints) occur, to check the operating and process parameters saved for the processing of the particular faulty component. In the case of consistently incorrect operating and process parameters, entire batches of components can be subsequently identified and checked for faults.

It is also possible for the control apparatus 22 of the first soldering device 10a to select, based on a code read in by the scanner 44, a soldering profile, a soldering parameter and/or a soldering program saved in the memory apparatus 26 of the first soldering device 10a, and to display it on a display of one of the soldering devices 10a, 10b, 10c and/or on a display of the electronic device 18.

Owing to the wireless data connection, it is also possible for the control apparatus 22 of the first soldering device 10a to wirelessly control at least one operating parameter of the second and/or third soldering device 10b, 10c. It is therefore conceivable, for example, for the control apparatus 22 of a soldering station 10a to control a speed of an electric motor 16 that drives a fan wheel of a solder-fume extraction device 10c (cf. FIGS. 1 and 2). It is conceivable in this case for the operating parameter of the second and/or third soldering device 10b, 10c to be controlled depending on an operating parameter of the first soldering device 10a. For example, the speed of the electric motor 20 that drives the fan wheel can therefore be controlled depending on the soldering temperature of a soldering tip, which temperature is set at the soldering station. It is also possible, however, for the operating parameter of the second and/or third soldering device 10b, 10c to be controlled depending on a measured process parameter of the first soldering device 10a. The speed of the electric motor 20 that drives the fan wheel can therefore be controlled depending on the temperature measured at a soldering tip of a soldering iron, for example. It is also conceivable for an electric motor 20 that drives the fan wheel to be switched on or off depending on the current operating state of the soldering station 10a.

Highly flexible communication between the soldering devices 10a, 10b, 10c can therefore be made possible in a simple manner in soldering systems 100 which comprise a plurality of soldering devices 10a, 10b, 10c.

Overall, a soldering device 10 and a soldering system 100 can thus be provided which allow integration and networking of the soldering device 10 and the soldering system 100 in a modern, Industry 4.0 factory.

What is claimed is:

1. Soldering system comprising
   a first soldering device comprising a control apparatus that has a central microcontroller and/or microprocessor and is designed for controlling at least one operating parameter of the soldering device, wherein a radio module is provided which comprises a communication module designed for setting up a wireless data connection,
   and at least a second soldering device comprising a control apparatus that has a central microcontroller and/or microprocessor and is designed for controlling at least one operating parameter of the soldering device, wherein a radio module is provided which comprises a communication module designed for setting up a wireless data connection, and
   at least one electronic device that comprises an output apparatus for visually outputting information,
   wherein the first soldering device is designed for setting up a wireless data connection to the second soldering device for wirelessly controlling the at least second soldering device, and
   wherein the first soldering device is designed for setting up a wireless data connection to the electronic device and for doing at least one of wirelessly relaying or wirelessly receiving data from the electronic device.

2. Soldering system according to claim 1, wherein the radio module comprises the central microcontroller and/or microprocessor.

3. Soldering system according to claim 1, wherein the radio module comprises an additional microcontroller and/or microprocessor which is different from the central microcontroller and/or microprocessor.

4. Soldering system according to claim 1, wherein a data line that is designed such that it connects the central microcontroller and/or microprocessor to the communication module, is provided.

5. Soldering system according to claim 3, wherein the data line is designed such that it indirectly connects the central microcontroller and/or microprocessor to the communication module via the additional microcontroller and/or microprocessor.

6. Soldering system according to claim 1, wherein the soldering device comprises a housing and the radio module is arranged in the housing.

7. Soldering system according to claim 4, wherein the soldering device comprises a housing on which a jack of the data line is arranged, wherein the radio module is arranged outside the housing and comprises a plug of the data line.

8. Soldering system according to claim 1, wherein the control apparatus comprises a memory designed for storing at least one of soldering programs and soldering parameters.

9. Soldering system according to claim 1, wherein the electronic device is a pair of smart glasses that display the information to be output directly in the field of vision of a user.

10. Soldering system according to claim 1, wherein a scanner 44 is provided which is designed for reading a visual code and is connected to the control apparatus of the first soldering device.

11. Method for operating a soldering system comprising
    a first soldering device comprising a control apparatus that has a central microcontroller and/or microprocessor and is designed for controlling at least one operating parameter of the soldering device, wherein a radio module is provided which comprises a communication module designed for setting up a wireless data connection,
    and at least a second soldering device comprising a control apparatus that has a central microcontroller and/or microprocessor and is designed for controlling at least one operating parameter of the soldering device, wherein a radio module is provided which comprises a communication module designed for setting up a wireless data connection, and
    at least one electronic device that comprises an output apparatus for visually outputting information,
    wherein the first soldering device is designed for setting up a wireless data connection to the second soldering device for wirelessly controlling the at least second soldering device, and
    wherein the first soldering device is designed for setting up a wireless data connection to the electronic device and for doing at least one of wirelessly relaying or wirelessly receiving data from the electronic device,
    wherein the method comprises the step of wirelessly controlling at least one operating parameter of the second soldering device through the control apparatus of the first soldering device.

12. Method according to claim 11, wherein the operating parameter of the second soldering device is controlled depending on an operating parameter of the first soldering device.

13. Method according to claim 11, wherein the operating parameter of the second soldering device is controlled depending on a measured operating parameter of the first soldering device.

* * * * *